(12) United States Patent
Ling et al.

(10) Patent No.: US 9,391,822 B2
(45) Date of Patent: Jul. 12, 2016

(54) METHODS AND APPARATUS FOR SYNCHRONIZATION IN MULTIPLE-CHANNEL COMMUNICATION SYSTEMS

(71) Applicant: MaxLinear, Inc., Carlsbad, CA (US)

(72) Inventors: Curtis Ling, Carlsbad, CA (US); Timothy Gallagher, Encinitas, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

(21) Appl. No.: 14/628,627

(22) Filed: Feb. 23, 2015

(65) Prior Publication Data

US 2015/0236885 A1 Aug. 20, 2015

Related U.S. Application Data

(60) Continuation of application No. 13/865,489, filed on Apr. 18, 2013, now Pat. No. 8,964,903, which is a division of application No. 12/979,270, filed on Dec. 27, 2010, now Pat. No. 8,681,900.

(60) Provisional application No. 61/290,224, filed on Dec. 27, 2009.

(51) Int. Cl.
| | |
|---|---|
| *H04L 27/00* | (2006.01) |
| *H04L 27/26* | (2006.01) |
| *H04L 1/20* | (2006.01) |
| *H04L 25/02* | (2006.01) |

(52) U.S. Cl.
CPC .............. *H04L 27/2627* (2013.01); *H04L 1/20* (2013.01); *H04L 25/0204* (2013.01)

(58) Field of Classification Search
USPC .......................... 375/326–327, 334–337, 344
See application file for complete search history.

(56) References Cited

U.S. PATENT DOCUMENTS

| | | | | |
|---|---|---|---|---|
| 6,058,138 | A * | 5/2000 | Fukumasa | .................. H04L 1/06 375/130 |
| 6,081,228 | A | 6/2000 | Leimer | |
| 7,881,237 | B1 * | 2/2011 | Narasimhan | ........ H04L 25/0228 370/206 |
| 2002/0176483 | A1 | 11/2002 | Crawford | |

(Continued)

FOREIGN PATENT DOCUMENTS

| | | |
|---|---|---|
| WO | 96/19056 A1 | 6/1996 |
| WO | 2008/095745 A1 | 8/2008 |

OTHER PUBLICATIONS

Int'l Seach Report and Written Opinion for PCT/US2010/062165 dated May 17, 2011.

*Primary Examiner* — Sam K Ahn
*Assistant Examiner* — Janice Tieu
(74) *Attorney, Agent, or Firm* — McAndrews, Held & Malloy, Ltd.

(57) ABSTRACT

Methods and apparatus for processing multichannel signals in a multichannel receiver are described. In one implementation, a plurality of demodulator circuits may provide a plurality of outputs to a processing module, with the processing module then simultaneously estimating noise characteristics based on the plurality of outputs and generating a common noise estimate based on the plurality of outputs. This common noise estimate may then be provided back the demodulators and used to adjust the demodulation of signals in the plurality of demodulators to improve phase noise performance.

16 Claims, 11 Drawing Sheets

(56) References Cited

U.S. PATENT DOCUMENTS

| | | | |
|---|---|---|---|
| 2003/0147460 A1* | 8/2003 | Laurent | H04L 25/0212 375/229 |
| 2007/0124356 A1 | 5/2007 | Moutchkaev et al. | |
| 2007/0171993 A1 | 7/2007 | Lai et al. | |
| 2008/0008258 A1* | 1/2008 | Tanabe | H04L 25/0204 375/267 |
| 2009/0041167 A1 | 2/2009 | Kadota et al. | |
| 2011/0103528 A1 | 5/2011 | Khayrallah | |

* cited by examiner

FIG. 1
Typical Communications System on Which Embodiments May be Implemented

FIG. 2

FIG. 3
An Example MCR with a generic single-carrier QAM demodulator as an example of a single-carrier receiver PHY.

FIG. 4
Top Level Block Diagram Illustrating Details of an Embodiment of the Invention

FIG. 5

FIG. 6
Processing Workflow for One Embodiment of the
Present Invention

FIG. 7
One Embodiment of a Processing Module PP1

FIG. 8
Example Received 256QAM Constellation Prior to
Demapping and Relative Signal Levels

FIG. 9

Example Channel Estimate and Correction Process

METHODS AND APPARATUS FOR SYNCHRONIZATION IN MULTIPLE-CHANNEL COMMUNICATION SYSTEMS

CROSS-REFERENCE TO RELATED APPLICATIONS

This application is a continuation of U.S. patent application Ser. No. 13/865,489 filed Apr. 18, 2013 (now U.S. Pat. No. 8,964,903), which is a divisional of U.S. patent application Ser. No. 12/979,270 filed Dec. 27, 2010 (now U.S. Pat. No. 8,681,900), which claims priority under 35 U.S.C. Section 119(e) to U.S. Provisional Patent Application Ser. No. 61/290,224, entitled "METHODS AND APPARATUS FOR SYNCHRONIZATION IN MULTIPLE-CHANNEL COMMUNICATION SYSTEMS," filed on Dec. 27, 2009. Each of the above-referenced documents is hereby incorporated by reference herein in their entirety for all purposes.

FIELD

The present invention relates generally to communications systems, including wired cable system, orthogonal frequency division multiplexing (OFDM) systems, and other multichannel communications systems. More particularly, but not exclusively, the invention relates to methods and apparatus for improving receiver performance by processing multiple received signals of a multichannel signal simultaneously to estimate and correct for phase noise and other signal anomalies.

BACKGROUND

Transmission across cable networks such as those used to distribute data or television services typically consist of approximately 1 GHz of spectrum which comprises many channels spaced 6-8 MHz apart. As consumer demand for bandwidth increases, customer premise systems are beginning to downconvert several channels from different parts of the spectrum in order to receive multiple channels for the purposes of additional data bandwidth or to permit the user to watch and record a multiplicity of channels. These channels are often modulated using a single carrier modulation such as 256 QAM used in DOCSIS, J.83 and DVB-C standards. To accommodate additional bandwidth demand, these systems may move to higher order modulation schemes such as 1024-point QAM, which will impose stringent demands on phase noise at the receiver.

Similarly, orthogonal frequency division multiplexed (OFDM) communications systems have been developed to address problems in high data rate communications systems such as expanding bandwidth in the presence of multipath interference. In an OFDM system, a transmitter receives an incoming data stream and modulates the data on orthogonal frequency domain subcarriers. The modulated subcarriers are then transmitted as an OFDM symbol to a receiver. By dividing the incoming data stream among multiple sub-carriers, the data rate and thus the bandwidth of these individual sub-carriers is decreased relative to the bandwidth of the incoming data stream. The resulting increase in the duration of the data symbols associated with each subcarrier can decrease the impact of multipath interference and associated inter-symbol interference (ISI).

In OFDM systems, using phase errors which are common to all subcarriers to suppress phase noise within a single channel is a well-known technique. Typically this technique is inherent to channel equalization performed in OFDM receivers, and allows phase noise on the order of the symbol rate to be removed effectively at the same time that the channel response is equalized.

In contrast, in systems processing multiple channels the phase noise from each subcarrier creates a noise skirt which acts as additive noise to other subcarriers and cannot be removed using this approach. In addition, previously known methods have not been possible in single-carrier systems such as cable transmission systems which use single-carrier QAM physical layers such as are used in DOCSIS and DVB-C J.83 annex A and B standards. These systems typically use a carrier tracking loop to remove close-in phase noise on the order of a few kHz, but are unable to remove phase noise at higher offsets. This phase noise is an important source of performance degradation particularly in modulations with higher-order constellations such as 256 or 1024 QAM. Consequently, there is a need in the art for methods and apparatus for providing enhanced performance in the presence of phase noise in multichannel communication systems such as may be used in cable or other applications.

BRIEF SUMMARY

This disclosure relates generally to communications systems, including cable transmission systems and orthogonal frequency division multiplexing (OFDM) systems. More particularly, but not exclusively, the disclosure relates to method and apparatus for improving receiver performance by processing multiple received signals of a multichannel signal simultaneously to estimate and correct for phase noise and other signal anomalies.

In one aspect, the disclosure relates to a method and apparatus for processing multiple channels simultaneously so as to determine multiple estimates of phase noise which may be combined in a processor circuit to generate a common noise estimate. This common noise estimate may then be provided to a plurality of demodulators to correct noise errors.

In another aspect, the disclosure relates to a method for improving multichannel receiver performance. The method may include, for example, determining, for a first of a plurality of signals corresponding to a first of a plurality of channels received at the multichannel receiver, a first weighting metric. The method may further include weighting, based at least in part on the first weighting metric, a raw phase error signal associated with the first of a plurality of signals so as to generate a first weighted phase error signal, determining, for a second of a plurality of signals corresponding to a second of a plurality of channels received at the multichannel receiver, a second weighting metric, weighting, based at least in part on the second weighting metric, a raw phase error signal associated with the second of a plurality of signals so as to generate a second weighted phase error signal, and combining the first weighted phase error signal and the second weighted phase error signal so as to generate a common phase error feedback signal. The method may further include providing the common phase error feedback signal to ones of a plurality of demodulator modules so as to correct a phase error in the demodulator modules.

In another aspect, the disclosure relates to a method for improving multichannel receiver performance. The method may include, for example, estimating, based on ones of a plurality of outputs of a plurality of demodulator circuits in response to receipt of corresponding ones of a plurality of received signals, a phase noise. The method may further include adjusting, responsive to said estimating, one or more of the plurality of received signals so as to enhance demodulation of the one or more of the plurality of received signals.

In another aspect, the disclosure relates to an apparatus for enhancing performance in a multichannel receiver. The apparatus may include, for example, a plurality of demodulator circuits configured to receive a corresponding plurality of received signals; and a processing module configured to: receive ones of outputs from the plurality of demodulator circuits, generate, based on the ones of outputs, an estimate of the phases of the received signals, and adjust, based at least in part on the estimate of the phases, the received signals so as to remove phase noise.

In another aspect, the disclosure relates to a method for improving multichannel receiver demodulation performance. The method may include, for example, receiving a channel bonded multichannel signal and providing ones of the multichannel signals to a corresponding ones of demodulator circuits. The method may further include processing, in the demodulator circuits, the ones of multichannel signals so as to generate a corresponding plurality of output signals, processing, in parallel, the plurality of output signals to generate a plurality of estimates of a common noise component of the multichannel signals, and generating, based on the plurality of estimates, a composite estimate of the common noise component.

In another aspect, the disclosure relates to communications receiver configured to receive multiple cable channels. The communications receiver may include, for example, a circuit configured to simultaneously generate a plurality of signals corresponding to a plurality of signals of a plurality of channels of the multichannel signal, and a processor configured to generate, based on the plurality of signals, an estimate of a common noise component of the plurality of signals. The common noise component may be provided to a plurality of demodulators so as to adjust the demodulators to correct noise.

Various additional aspects, embodiments, and details are further described below in conjunction with the appended Drawings.

BRIEF DESCRIPTION OF THE DRAWINGS

The present invention is more fully appreciated in connection with the following detailed description taken in conjunction with the accompanying drawings, wherein.

DETAILED DESCRIPTION OF EMBODIMENTS

Overview

The present invention is directed to methods and apparatus for performance enhancement in multichannel communications systems.

In various embodiments, the present invention provides methods and apparatus for suppressing phase noise and similar degradations in systems which receive a multiplicity of channelized signals, which could be, for example, cable television transmission systems, single-carrier or OFDM signals or some combination of these or other signals. A common application where embodiments of the invention may be used are in communication systems where several single-carrier channels are being received and demodulated simultaneously by a receiver, such as in a cable television system. Such a configuration is becoming a common means of increasing bandwidth in an existing transmission systems such as those used in multiple channel television distribution.

For example, in the DOCSIS 3.0 standard physical layer (PHY), the customer premise equipment (CPE) must receive several channels distributed throughout the cable spectrum, demodulate the signals and combine the resulting data from each channel in a process called "channel bonding." In effect, the bonded channels are processed simultaneously in the demodulator circuits, and while each channel may have independent noise elements or other perturbations, due to the bonding they may also share common noise characteristics, such as phase noise added in demodulation circuits such as oscillators. For example, in cable video distribution, it is often desirable to receive several cable channels at once to provide multichannel functions such as picture in picture, watch-and-record, and distribution of multiple video channels throughout the home for consumption by several end users. These channels may be bonded to perform such processing.

Figure 1:
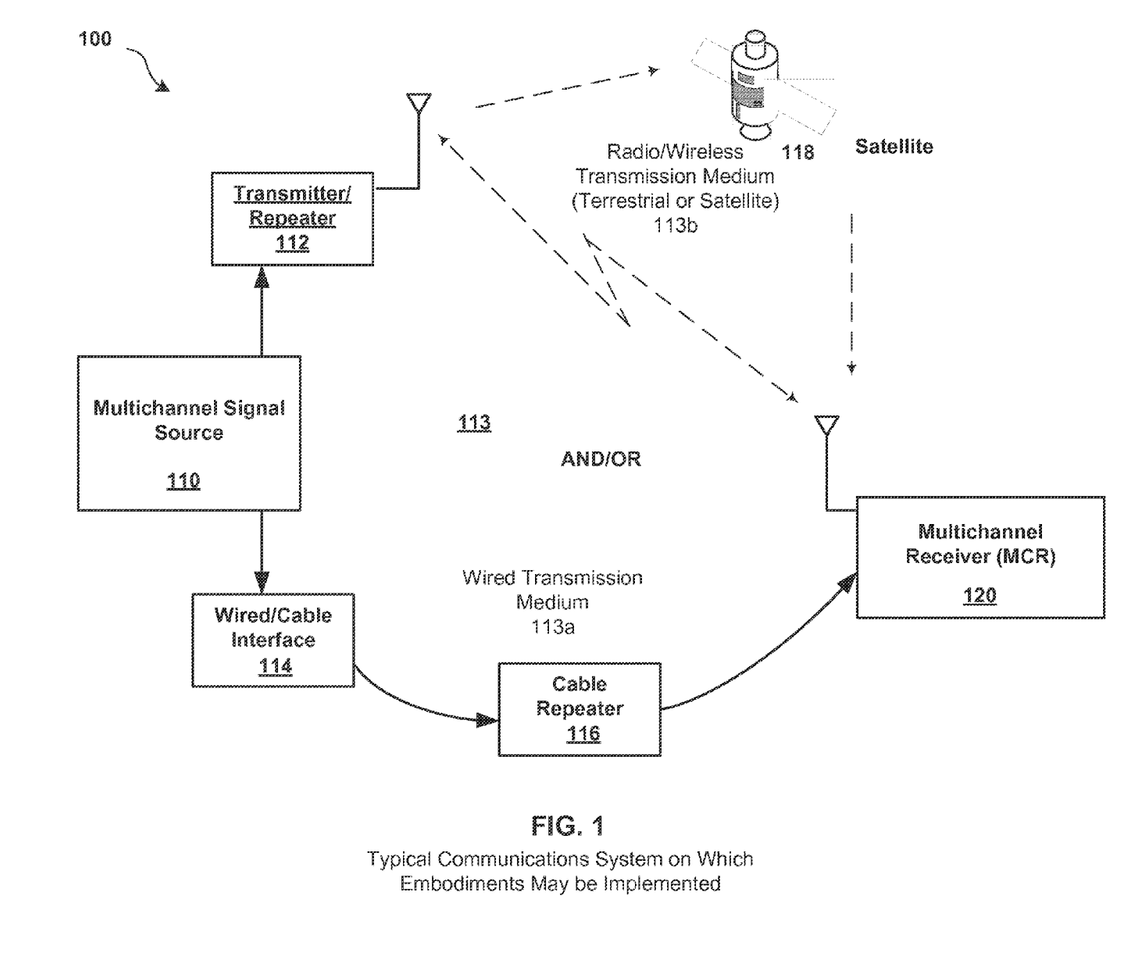
FIG. 1 illustrates a typical communications system on which embodiments of the present invention may be implemented.

Attention is now directed to FIG. 1 which illustrates a general system configuration 100 on which embodiments of the present invention may be implemented. It is noted that system 100 is shown for purposes of illustration in order to describe typical or representative implementations and is not intended to be limiting. Consequently, it will be apparent to one of ordinary skill in the art that embodiments of the present invention may also be applied to other configurations.

As shown in FIG. 1, system 100 includes a signal transmission medium 113 (such as, for example, media 113a and/or 113b), such as a wired or wireless communications channel, that is disposed to provide multiple channels of data in a multichannel format. System 100 may be, for example, a cable television transmission system, an OFDM system, and/or a system including a combination of separate single-carrier signals such as may be provided in a cable television system or satellite system. Two or more signals may be provided simultaneously from one or more sources as a multichannel signal through transmission medium 113 to a multichannel communications receiver 120, where the multi-channel signals may then be demodulated and provided for display, recording and/or further processing in or from the receiver 120.

In particular, a multichannel signal source or sources 110 may provide a multichannel signal to multichannel communication receiver (MCR) 120 (as used herein, communications receivers configured for receiving several individual channels simultaneously are denoted as multi-channel receivers or MCRs) through one or more transmission media 113*a*, 113*b*. In typical implementations the transmission medium 113 will include a wired connection 113*a*, such as is provided in cable television systems. Alternately, or in addition, transmission medium 113 may include a wireless medium 113*b*, such as through a terrestrial or satellite communication link, or a combination of wired and wireless connections. In any case, the MCR is configured so as to receive the multichannel signal having a plurality of signals, of which two or more of the plurality of signals may be demodulated in the MCR 120.

Figure 2:
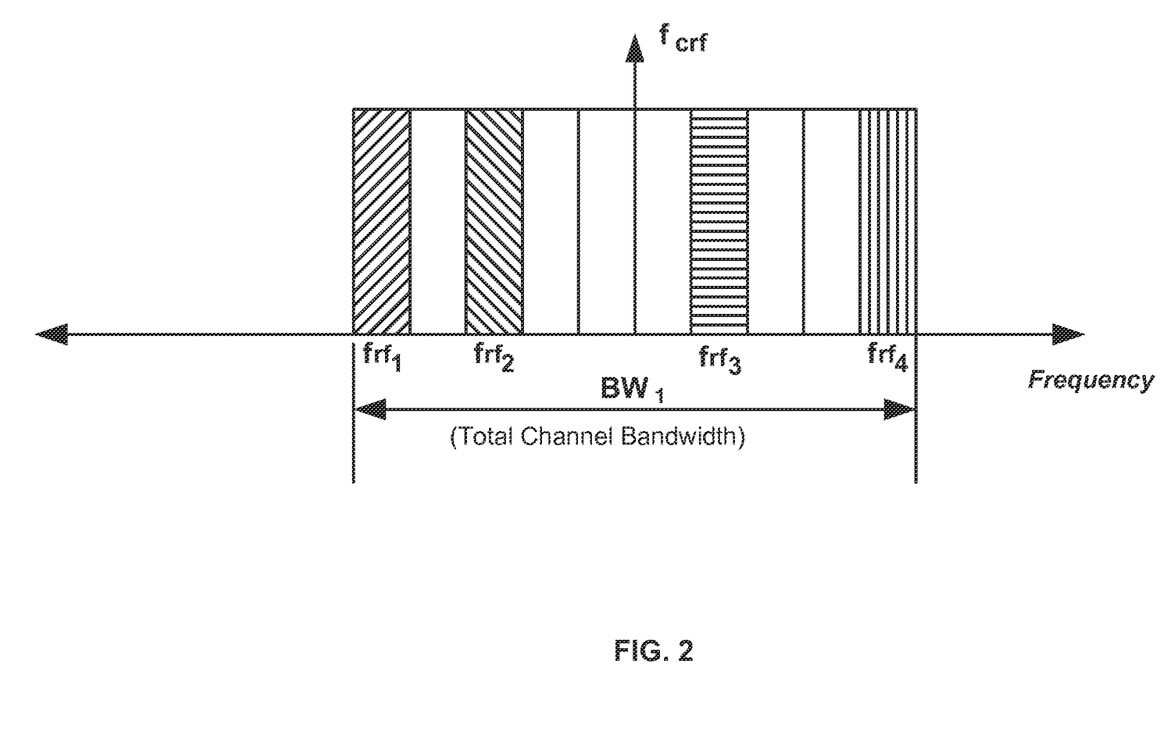
FIG. 2 illustrates multiple signal channels in a received channel bandwidth in a multichannel receiver architecture.

Attention is now directed to FIG. 2, which illustrates the frequency spectrum for a multi-channel transmission signal containing, as an example, four individual signals on four corresponding channels. These may be, for example, separate television programs in a cable television system. The four channels occupy frequency ranges frf1 through frf4 within a total multichannel signal spectrum having a bandwidth BW1, centered at frequency fcrf. As shown in FIG. 2, there may be more channels within the total bandwidth BW1 that may include other channels that may not be of interest at a particular time (such as, for example, other programs on alternate channels in a cable television system). These are shown in FIG. 2 in white, while the four example channels of interest are shown in various hatched patterns.

In conventional systems, the channels of interest are demodulated by a plurality of separate demodulator subsystems which are substantially identical to each other but use narrowband processing to demodulate the multiple signals separately.

Figure 3:
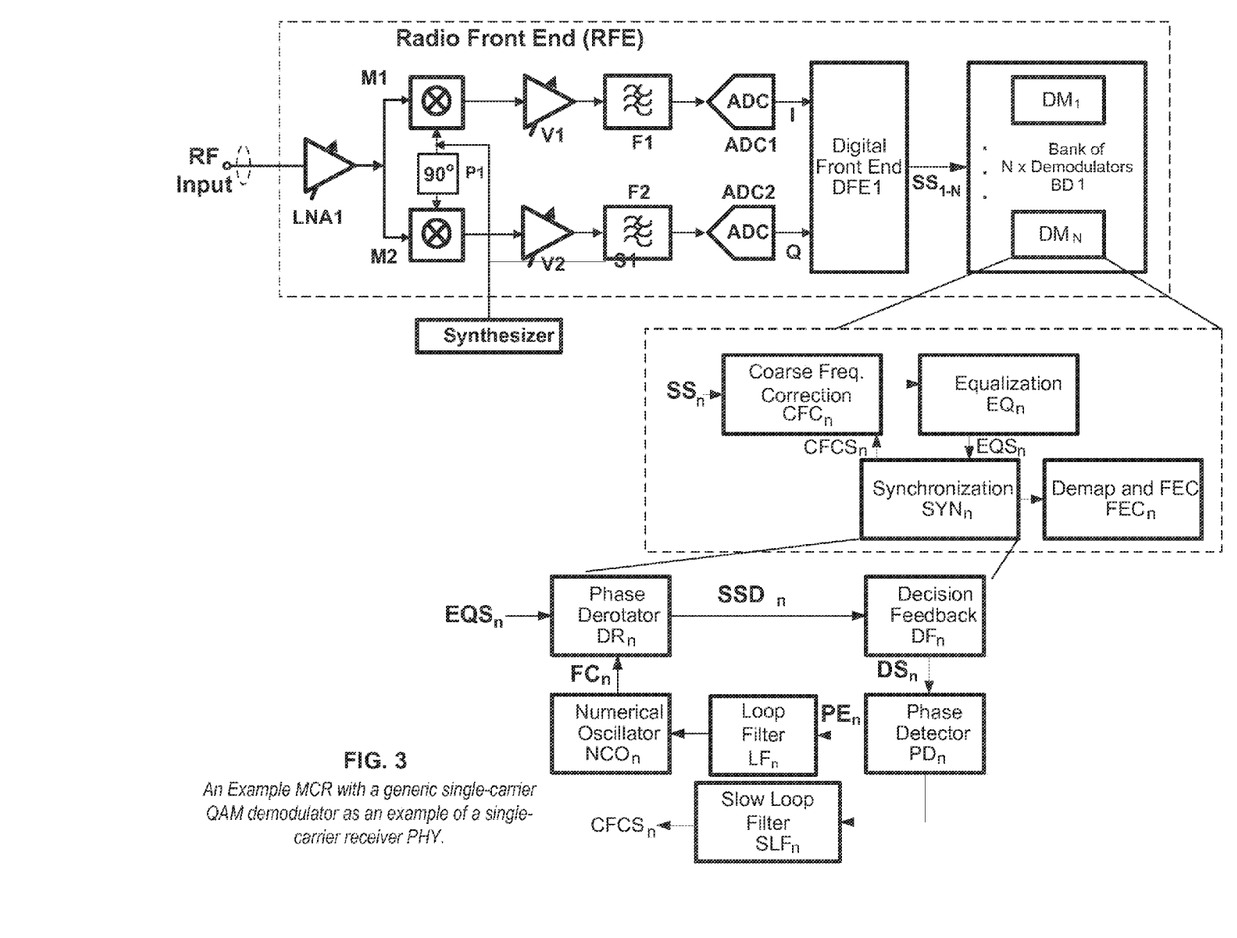
FIG. 3 illustrates a multichannel receiver architecture.

In typical MCRs, it is quite common for these systems to be converted to baseband by a common local oscillator, and optionally a common mixer. A representative MCR is shown in FIG. 3, along with asynchronization block SYNn and details of an example implementation. The RF input contains a multiplicity of channelized signals RFC 1-N which are downconverted by the radio front end. Synthesizer S1 provides a local oscillator signal to mixers M1 and M2 in an IQ mixer of a direct conversion receiver. Filters F1 and F2, and data converters ADC1 and ADC2, operate with sufficient bandwidth to accommodate several single-carrier signals SS1-N which may or may not be contiguous in spectrum. The frequency and phase of S1 is typically different from that of the RF input, and therefore a means of synchronization (carrier recovery) is necessary to demodulate the single carrier signals SS1-N.

Figure 11:
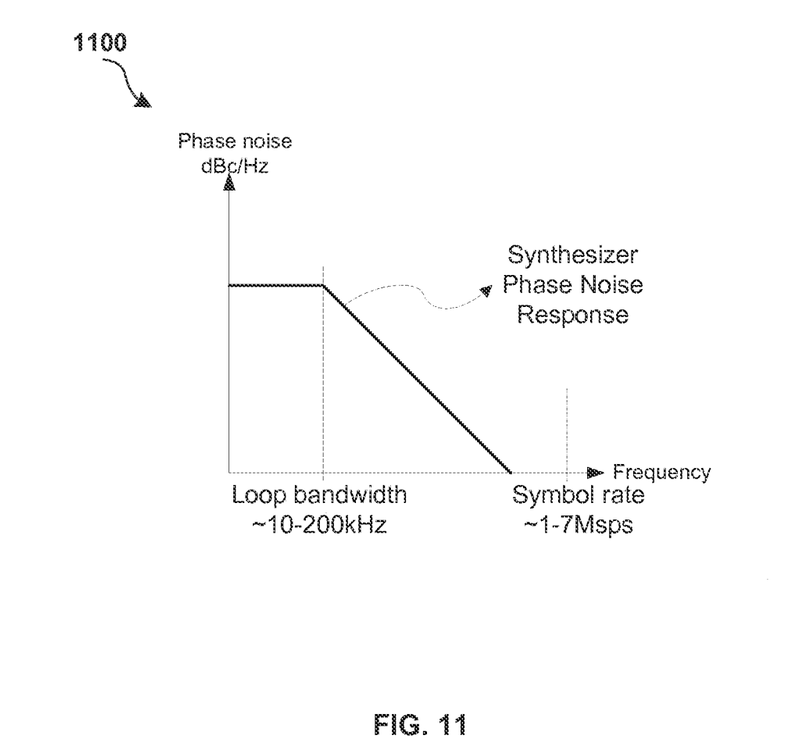
FIG. 11 is a qualitative illustration of the phase noise characteristic of a synthesizer, showing how the phase noise is dominated by the portion of the spectrum around or below the loop bandwidth of the synthesizer, which is typically between 10 and 500 kHz, much lower than the symbol rate.

Typically each demodulator DMn runs as an independent, substantially identical unit. A decision feedback block DFn feeds a phase detector PDn whose output is filtered by two loop filters (LFn and SLFn). The 'slow' loop filter (SLFn) is used to remove the coarse frequency offset, and feeds back to the Coarse Frequency Correction (CFCn). LFn is a wider bandwidth filter used to control a numerically-controlled oscillator NCOn which feeds a phase derotator DRn removing the carrier phase noise introduced by synthesizer S1. As shown in FIG. 11, phase noise is typically dominated by the portion of the spectrum around or below the loop bandwidth of the synthesizer.

In various aspects, embodiments of the present invention may be directed towards providing enhanced performance by processing a plurality of channels of the multichannel signal in a composite processing circuit rather than in separate circuits as in a conventional MCR. This approach may be used to generate estimates of phase noise and/or channel characteristics, which may then be used to enhance demodulation performance. This approach may provide particular advantages in speed and performance by processing the multiple channels simultaneously rather than processing the separate channels sequentially. Moreover, enhancing phase noise performance in accordance with aspects of the present invention may facilitate improved overall system performance by requiring less complex and/or power consumptive oscillator circuits (i.e., by requiring oscillator phase noise performance to be lower than in conventional systems). This may be particularly important as integrated circuit feature sizes are decreased and/or device power consumption is lowered.

Figure 4:
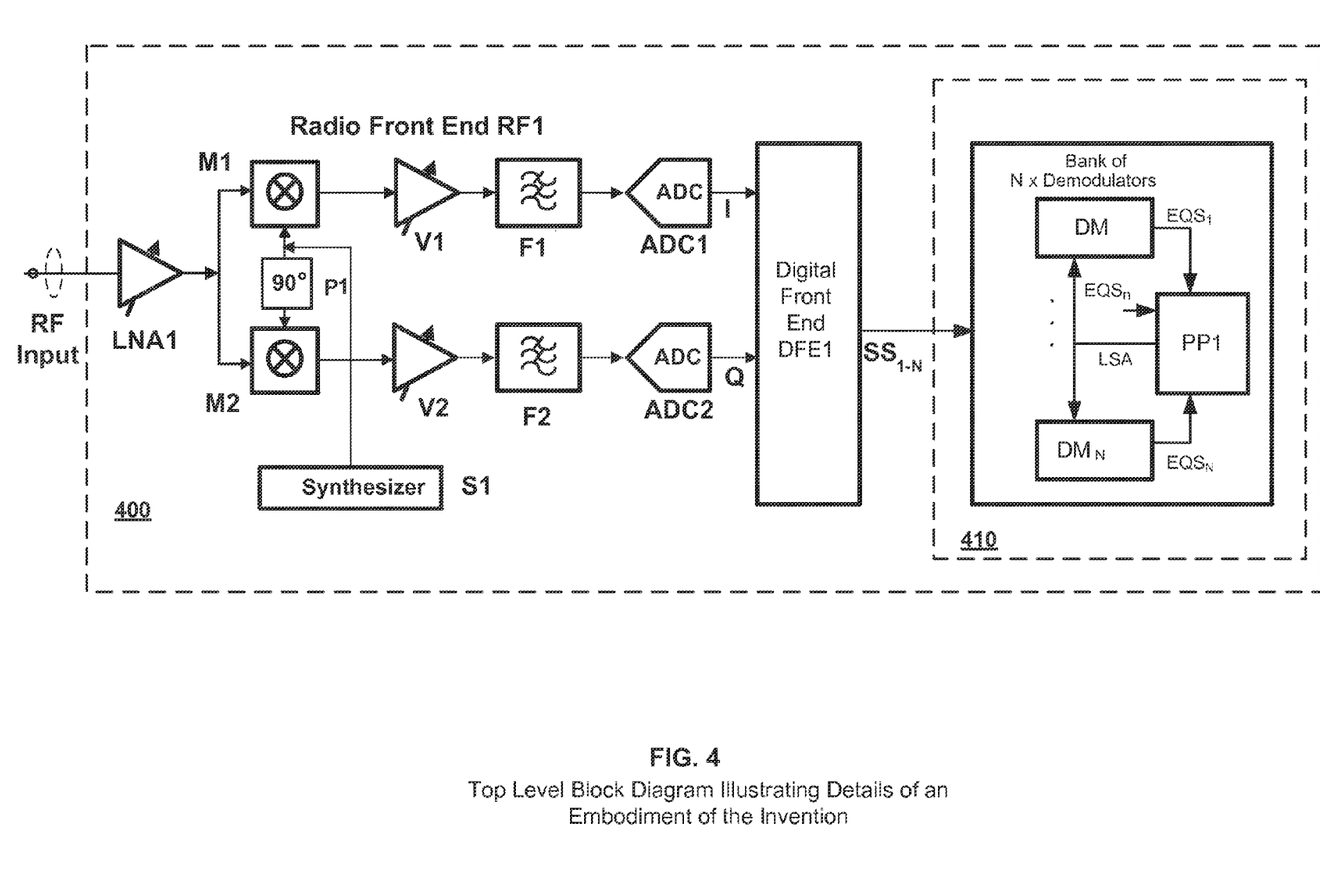
FIG. 4 illustrates details of an embodiment of the present invention in a multichannel receiver.

Turning now to FIG. 4, one example embodiment 410 of the present invention is shown as a sub-system of an MCR 400. Some or all of the elements shown in FIG. 4 may be implemented as a signal processing module, which may be component of an MCR. As shown in FIG. 4, a Radio Front End (RF1) receives the multichannel signal (such as the signal within frequency range BW1 of FIG. 3), quadrature downconverts the signal to an IF frequency or baseband, digitizes the I and Q signal components (at ADC1 and ADC2), and then provides the digitized signals to a Digital Front End (DFE1). DFE1 then provides signals $SS_1$-$SS_N$ to processing module 410 for further processing in accordance with the present invention.

Figure 5:
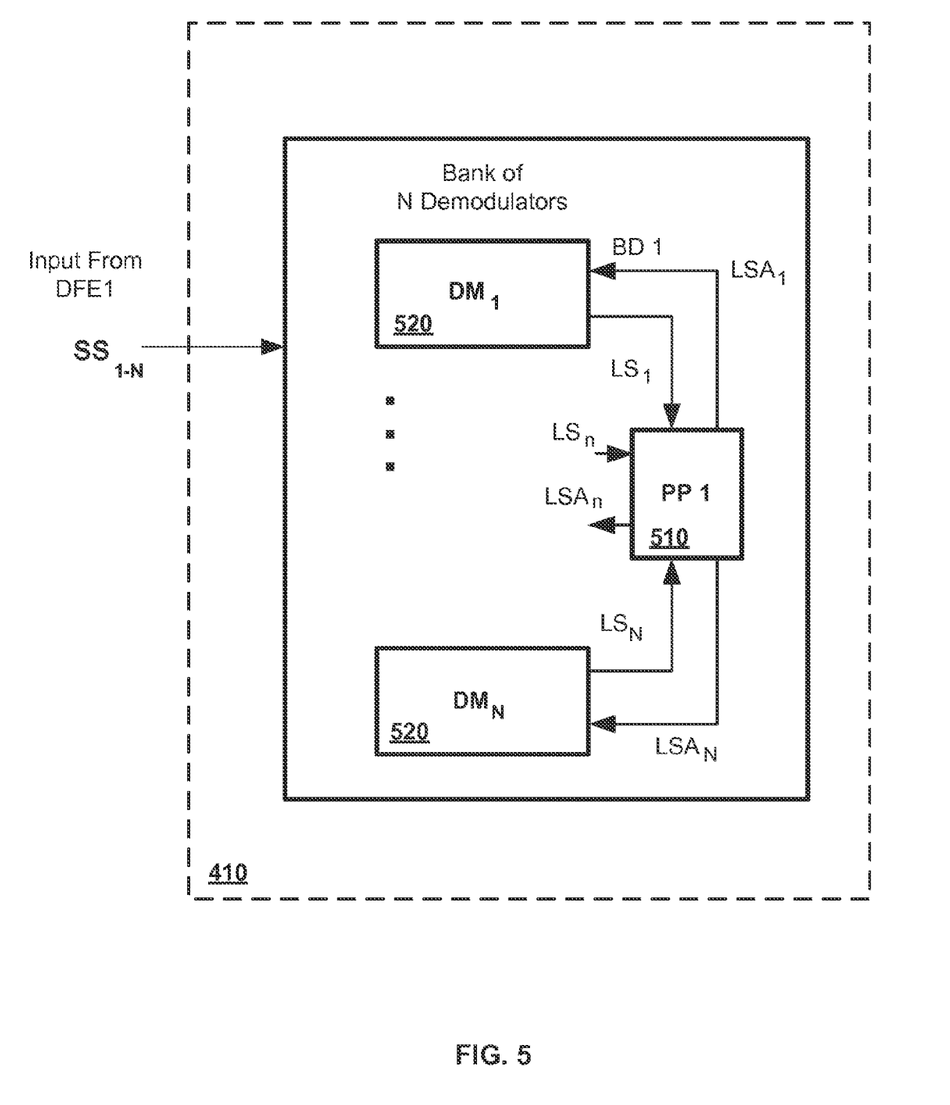
FIG. 5 illustrates additional details of the embodiment shown in FIG. 4.

Attention is now directed to FIG. 5 which illustrates further details of module 410. Module 410 may include a bank of demodulators 520 $DM1$-$DM_N$ (referenced herein in combination as DM), configured to demodulate a corresponding set of separate signals from the composite signal. Demodulators $DM1$-$DM_N$ may be configured for standard signal demodulation as is known in the art. Output signals $WPA1 \ldots WPA_N$ may be the phase detector outputs from each of the separate demodulation circuits $DM1$-$DM_N$ in the bank DM, possibly weighted by the reliability of the measurement from $DM_n$.

The outputs of $DM_1$-$DM_N$ are provided to a signal processing circuit 510, which may be a component of a signal processing module, also denoted herein as PP1 510. PP1 510 may comprise an ASIC, DSP, microprocessor or microcontroller, programmable logic device, or other device or circuit configured for performing processing of digital signals. Processor PP1 510 receives channel signals $EQS_1 \ldots EQS_N$ and generates improved estimates of the phases of the received signals, and may feed back to each $DM_n$ a common phase error correction, which is derived from the multiple channel signals provided by $EQS_1 \ldots EQS_N$. In addition, PP1 510 may alternately or in addition remove phase noise introduced by the synthesizer S1 (as shown in FIG. 4).

Figure 7:
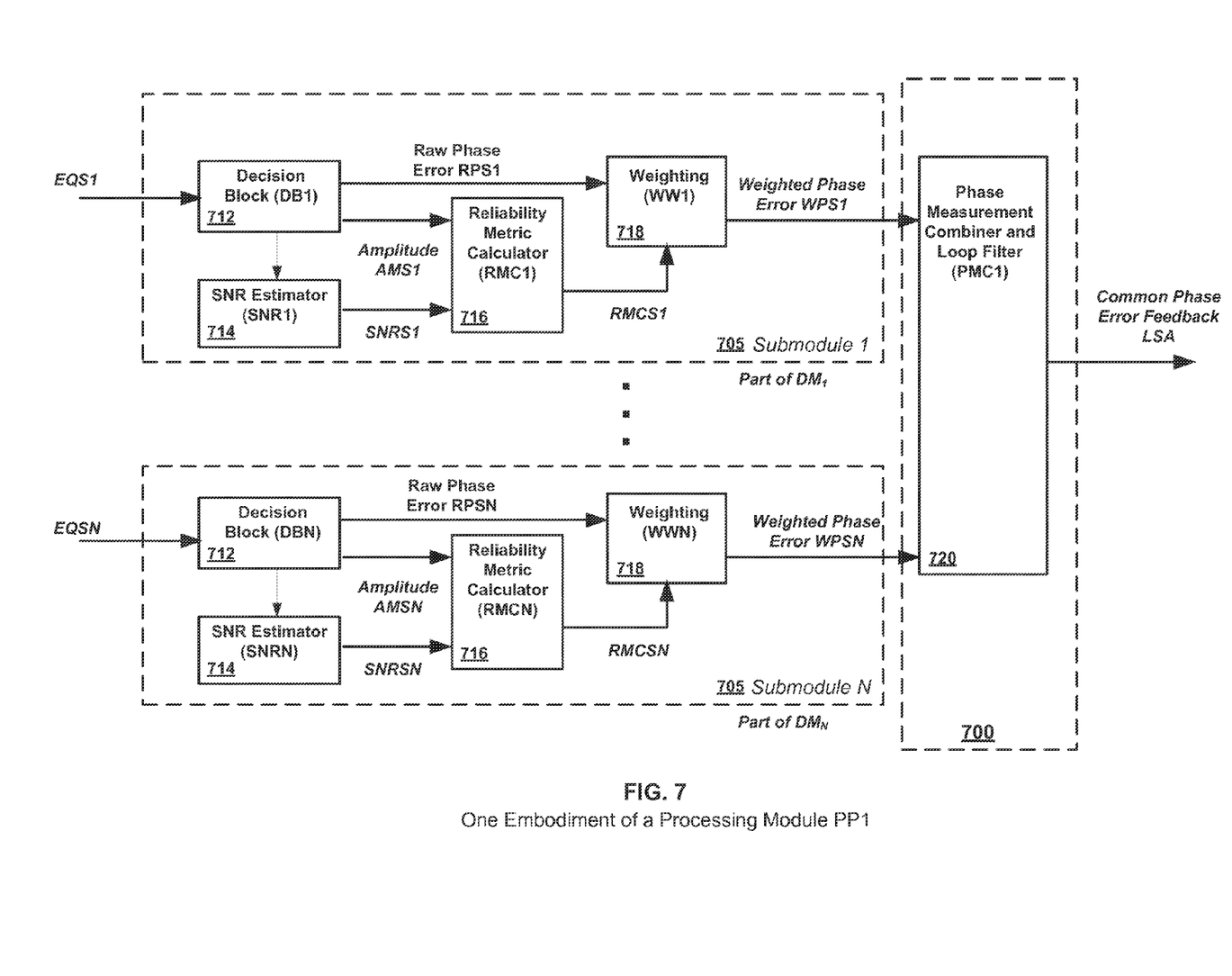
FIG. 7 illustrates details of an embodiment of a signal processing module in accordance with the present invention.

Processing as may be performed in PP1 510 may be done in various ways—one example is shown in FIG. 7. Channel signals EQSn are fed to a decision block which determines the raw phase error component RPSn of each signal. $EQS_n$ are also fed to an SNR estimator SNRn and reliability metric calculator RMCn which produce a signal RMCSn which weights the raw phase error prior to filtering of the phase errors from each channel in PMC1. One example of this filtering is a simple averaging of the weighted phase error signals. Thus PMC1 produces a superior estimate of the common phase error LSA present in each of the demodulators DMn. LSA is subtracted from the phase error computed by each channel, as shown in FIG. 10.

Figure 6:
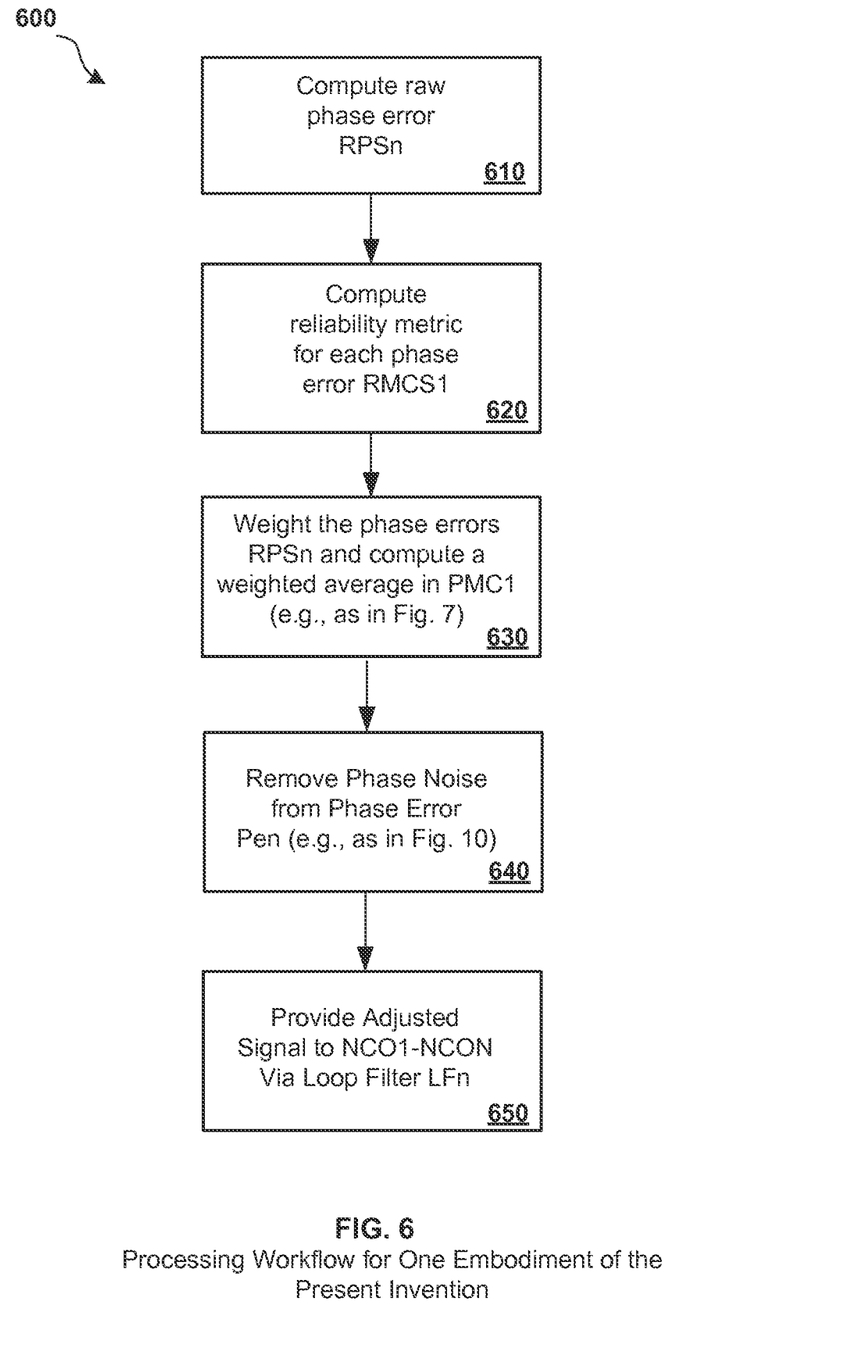
FIG. 6 illustrates details of an embodiment of signal processing in accordance with aspects of the present invention.
Figure 10:
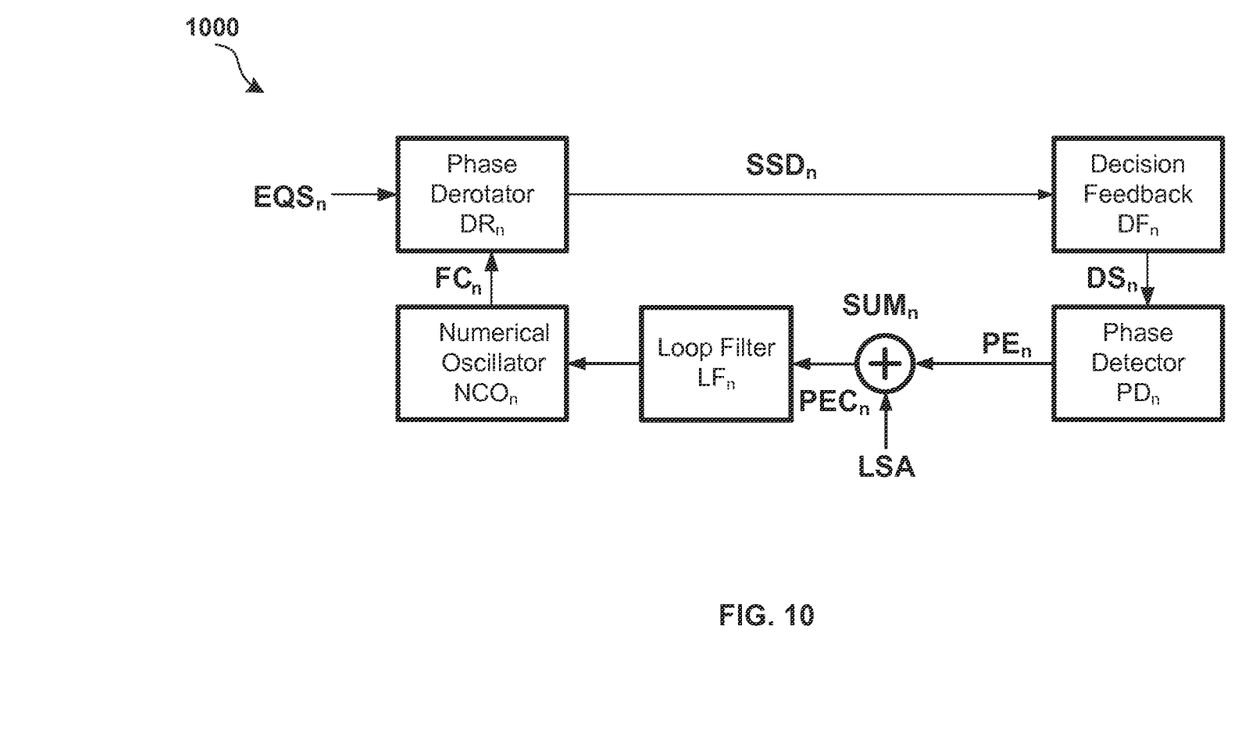
FIG. 10 illustrates one embodiment of how the common phase noise may be removed from a particular signal by use of a summing node which subtracts the estimated common phase noise due to the system synthesizer.

As one example embodiment, FIG. 6 illustrates details of a process 600 for performing signal processing to provide an adjusted signal to oscillators, such as numerically controlled oscillators (NCOs) such as are shown in FIG. 10. At stage 610, a raw phase error, such as RPSn, may be computed for a plurality N of signals, such as shown in FIG. 7. A reliability metric, such as RMCSn, may be calculated at stage 620. This may be done for each raw phase error in a plurality of submodules associated with the plurality N of signals. At stage 630, the phase errors may be weighted and a weighted average metric, such as shown in FIG. 7, may be determined. Phase noise may then be removed at stage 640 from the phase error value, such as Pcn, such as shown in FIG. 10. At stage 650, an adjusted signal may be provided to the NCOs, such as NCO1-NCON for adjustment of the oscillator. This may be done via a loop filters, such as filter LFn as shown in FIG. 10.

FIG. 11 shows an idealized plot of the phase noise power spectral density introduced by a typical frequency synthesizer (e.g., 51 in FIG. 3). The PSD shows increased phase noise at lower frequencies, shaped by the loop bandwidth of the synthesizer. Traditional methods for suppressing the phase noise take advantage of the fact that the symbol rate is much faster than the loop bandwidth of the synthesizer, and perform filtering over time using a phase error tracking filter which has a high-pass response. The inventive aspects described in this disclosure may be used to permit filtering (averaging) across a multiplicity of channels at the same time, which allows suppression of the phase noise in the system across the entire spectrum.

Alternative methods which estimates the phase errors of each received signal and combines these estimates in some fashion to yield an estimate of the phase error which is common among the signals can also be used.

Because the frequency offset of the channels received by each demodulator module (e.g., DMi as shown in FIG. 4 and FIG. 5) may be different from that of the other demodulators, each DMi may be configured to remove the frequency error through its own frequency offset estimator, which may use a much slower loop which is insensitive to symbol-to-symbol phase variation.

Turning again to FIG. 7, additional details of an embodiment of aspects of the invention are shown. As shown in FIG. 7, a PP1 module 700 (which may be an implementation of the PP1 modules shown in FIG. 4 and FIG. 5), processes received signal data to provide an estimate of the common phase error, LSA. Signals from each demodulator DMi-n may be combined within PP1 by summing the weighted signals.

More specifically, at the start of this processing in module 700, Decision Block DB1 712 receives EQS1 . . . EQSN and makes a decision, given the in-phase (I) and quadrature (Q) amplitudes, which modulation point was most likely transmitted. Once the decision has been made, an estimate of the phase error can be computed by calculating the angle between the ideal decision point and the I/Q amplitudes. The phase error from each decision block may be weighted by a reliability metric (implemented in modules RMC1 716 and WW1 718). The weighted phase errors from the submodules may then be provided to Phase Measurement Combiner and Loop Filter PMC 1 720 for combining and filtering to produce an estimate of the common phase error LSA.

An SNR Estimator Module 714 may be included to provide an SNR estimate to the Reliability Metric Calculation Module RMC1 716 for the reliability metric calculation. A reliability metric RMCS1 is provided from RMC1 module 716 to weighting module 718, where it may then be used in WW1 module 718 to weight the raw phase error RPS1 to generate weighted phase error WPS1. Weighted phase error WPS1 may then be provided from each of the submodules 705 (submodules 1-*n* as shown in FIG. 7) to PMC 1 module 720, which generates a Common Phase Error Feedback Signal, LSA.

Figure 8:
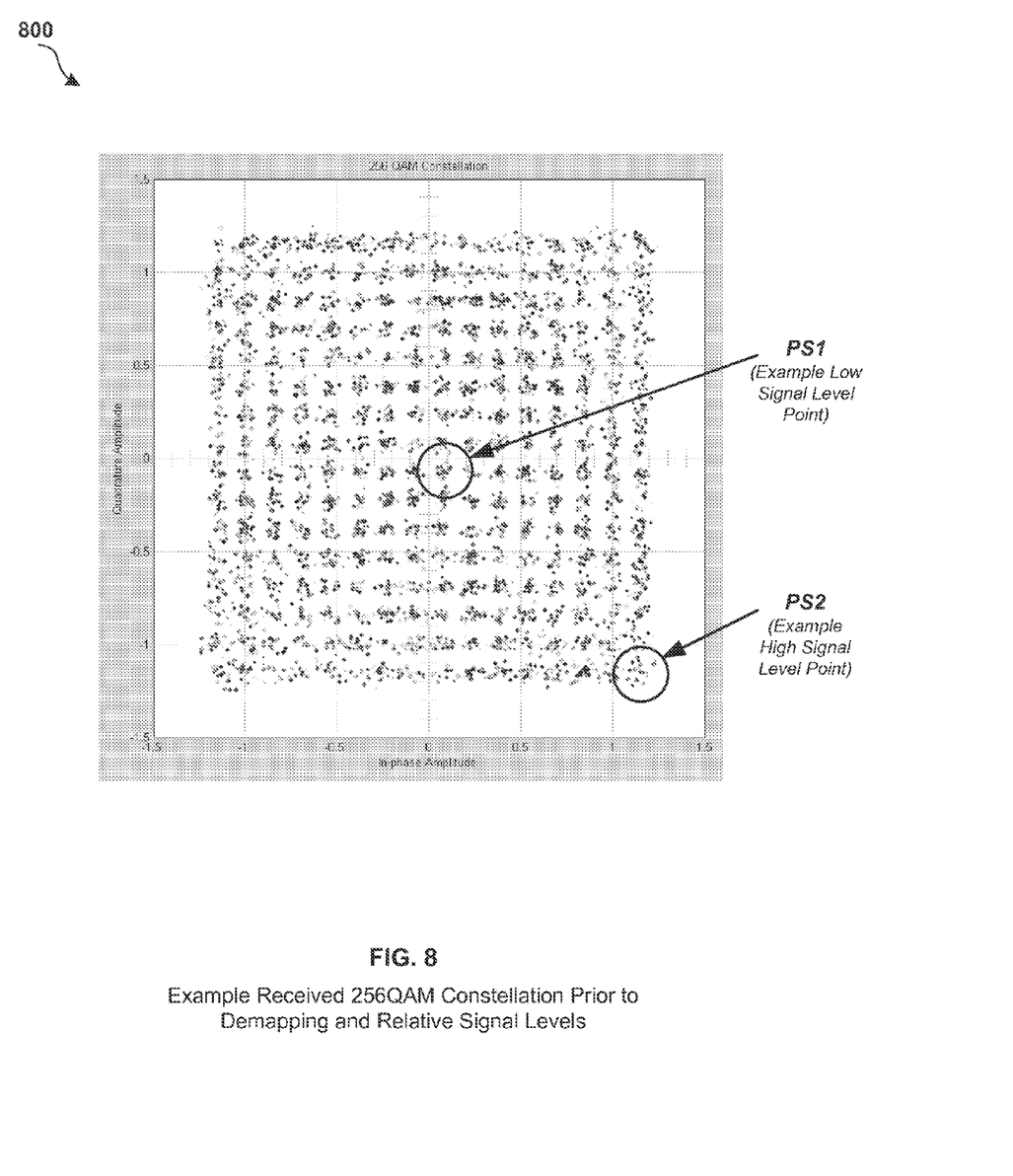
FIG. 8 illustrates an example 256 QAM signal constellation and associated received signal levels in accordance with aspects of the present invention.

The estimate LSA may then be provided as a feedback signal to each demodulator DMi such as is shown in FIG. 4 and FIG. 5. This processing allows the system to weight the phase information from low-amplitude signals less than high-amplitude signals. As an example, FIG. 8 illustrates a 256 QAM constellation and associated received signals. An example of a low-amplitude signal would be the constellation points close to the origin, such as constellation point PS1 shown in FIG. 8, which is subject to other noise sources such as additive white noise and can result in large spurious changes in estimated phase having nothing to do with the actual phase noise. This is in contrast to relatively high-amplitude signals such as is shown at constellation point PS2, which would provide phase information with greater reliability. In accordance with the present invention, the phase information from the low-amplitude signal corresponding to point PS1 of constellation 800 can be weighted at a lower weighting value relative to the weighting of the high-amplitude signal corresponding to point PS2.

In a typical implementation, a communications system incorporating an embodiment of the invention may benefit from the fact that the transmitted signals are often modulated with a common synthesizer or reference, or with synthesizers whose phase noise is extremely low in comparison to the receiver.

Figure 9:
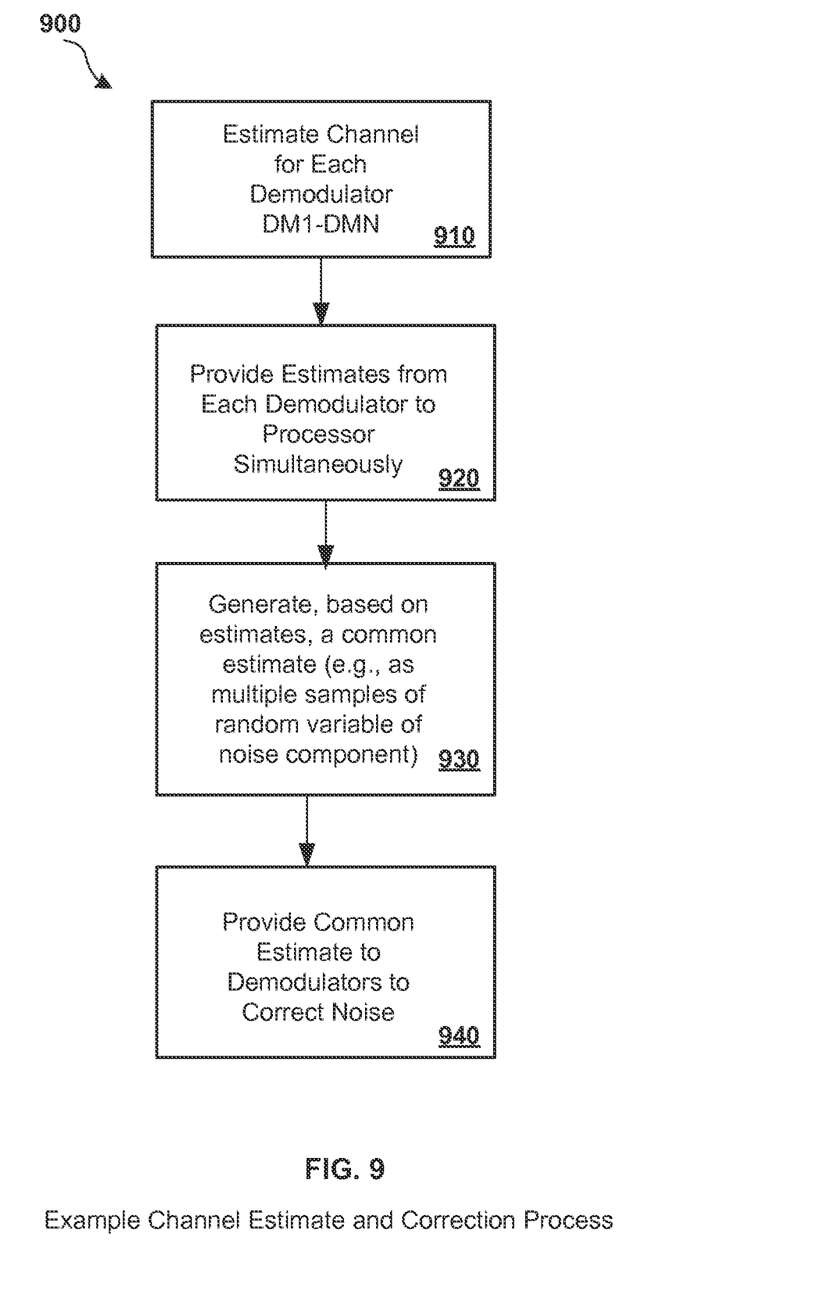
FIG. 9 illustrates details of an embodiment of channel estimation and correction in accordance with aspects of the present invention.

In another embodiment as shown in Process 900 of FIG. 9, channel estimates obtained by an equalizer EQn coupled to each demodulator may be used to improve the equalization performed by each demodulator, since, for example, in cable systems the delay spread experienced by each individual channel may share similar characteristics. At stage 910, channel estimates for each demodulator of a plurality of N demodulators DM1-DMN may be made. At stage 920, the estimates may be provided to a processor module, such as described previously herein. The estimates may be provided substantially simultaneously. At stage 930, a common estimate may be generated based on the plurality of channel estimates. For example, this may be done as multiple samples of a random variable of a noise component. At stage 940, the common estimate may be provided to the demodulators. The estimates may then be used by the demodulators to adjust or correct for noise in the received signals, such as described previously herein.

In summary, various embodiments of the present invention may provide performance advantages in multichannel communications systems by using carrier recovery signals from a plurality of demodulators receiving signals for individual channels to estimate impairments, including phase noise, introduced by a receiver, and in particular by a synthesizer element of the receiver.

Once the impairment is estimated, the individual channels may be correspondingly adjusted, based on the estimate, so as to improve demodulation performance. By using the channel estimation information obtained from a plurality of demodulators, the channel estimates for particular channels may then be improved.

In some configurations, the apparatus described herein includes means for performing various methods, processes, and/or functions as described herein. In one aspect, the aforementioned means may be a processor or processors and associated memory in which embodiments reside and which are configured to perform the functions recited by the aforementioned means. In another aspect, the aforementioned means may be a module or apparatus configured to perform the functions recited by the aforementioned means.

It is noted that in various embodiments the present invention relates to one or more processes such as are described and/or illustrated herein. These processes are typically implemented in one or more modules or circuits as are described herein, and such modules may include computer software stored on a computer readable medium including instructions configured to be executed by one or more processors and/or associated process steps or stages. Alternately or in addition, embodiments of the processes described herein may be embodied in hardware devices configured for implementing analog or digital logic such as programmable logic devices, ASICs, DSPs, FPGAs, microprocessors, gate arrays or other electronic devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It is further noted that, while the processes described and illustrated herein may include particular steps or stages, it is apparent that other processes including fewer, more, or different stages than those described and shown are also within the spirit and scope of the present invention. Accordingly, as noted previously, the processes and associated modules shown herein are provided for purposes of illustration, not limitation.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in device such as a user terminal, cable box, etc. In the alternative, the processor and the storage medium may reside as discrete components in the device.

Some embodiments of the present invention may include computer software and/or computer hardware/software combinations configured to implement one or more processes or functions associated with the present invention such as those described herein. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler or other machine code generation mechanisms, scripting programs, PostScript programs, and/or other code or files containing higher-level code that are executed by a computer using an interpreter or other code execution mechanism.

Computer code may be comprised of one or more modules executing a particular process or processes to provide useful results, and the modules may communicate with one another via means known or developed in the art. For example, some embodiments of the invention may be implemented using assembly language, Java, C, C#, C++, scripting languages, and/or other programming languages and software development tools as are known or developed in the art. Other embodiments of the invention may be implemented in hardwired circuitry in place of, or in combination with, machine-executable software instructions.

It is noted that the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated. It is intended that the following claims and their equivalents define the scope of the disclosure.

What is claimed is:

1. A system comprising:
a plurality of demodulator circuits, each of said plurality of demodulator circuits comprising a respective one of a plurality of equalizer circuits; and
a processor circuit, wherein:
each of said plurality of equalizer circuits is configured to generate a respective one of a plurality of channel estimates based on a respective one of a plurality of channels of a multichannel signal;
said processor circuit is configured to generate a common channel estimate based on said plurality of channel estimates; and
each of said plurality of demodulator circuits is configured to demodulate a respective one of said plurality of channels of said multichannel signal with use of a respective one of said plurality of channel estimates and said common channel estimate.

2. The system of claim 1, wherein each of said plurality of demodulator circuits is configured to correct for noise in said multichannel signal based on said common channel estimate.

3. The system of claim 1, comprising a radio front end configured to downconvert and filter said multichannel signal to output each of said plurality of channels of said multichannel signal to a respective one of said plurality of demodulators.

4. The system of claim 1, comprising:
an in-phase analog-to-digital converter configured to concurrently digitize said plurality of channels of said multichannel signal; and
a quadrature-phase analog-to-digital converter configured to concurrently digitize said plurality of channels of said multichannel signal.

5. The system of claim 4, comprising a digital front end circuit which receives an in-phase digital signal generated by said in-phase analog-to-digital converter and a quadrature-phase signal generated by said quadrature-phase analog-to-digital converter.

6. The system of claim 5, wherein said digital front end circuit is operable to select each one of said plurality of channels for conveyance to a respective one of said plurality of demodulator circuits.

7. The system of claim 1, wherein each of said plurality of demodulator circuits is configured to use said respective one of said plurality of channel estimates to correct noise present in said respective one of said plurality of channels.

8. The system of claim 1, wherein said multichannel signal is a channel bonded cable television signal.

9. A method comprising:
in a receiver comprising a plurality of demodulator circuits, wherein each of said plurality of demodulator circuits comprises a respective one of a plurality of equalizer circuits, and comprising a processor circuit:
generating, by each of said plurality of equalizer circuits, a respective one of a plurality of channel estimates based on a respective one of a plurality of channels of a multichannel signal;
generating, by said processor circuit, a common channel estimate based on said plurality of channel estimates; and
demodulating, by each of said plurality of demodulator circuits, a respective one of said plurality of channels of said multichannel signal using a respective one of said plurality of channel estimates and said common channel estimate.

10. The method of claim 9, comprising correcting, by each of said plurality of demodulator circuits based on said common channel estimate, noise in a respective one of said plurality of channels of said multichannel signal.

11. The method of claim 9, comprising downconverting and filtering, by a radio front end circuit, said multichannel signal to output each of said plurality of channels of said multichannel signal to a respective one of said plurality of demodulators.

12. The method of claim 9, comprising concurrently digitizing, by an in-phase analog-to-digital converter circuit and a quadrature-phase analog-to-digital converter circuit, said plurality of channels of said multichannel signal.

13. The method of claim 12, comprising receiving, by a digital front end circuit, an in-phase digital signal generated by an in-phase analog-to-digital converter and a quadrature-phase signal generated by a quadrature-phase analog-to-digital converter.

14. The method of claim 13, comprising selecting, by said digital front end circuit, each one of said plurality of channels of said multichannel signal for conveyance to a respective one of said plurality of demodulator circuits.

15. The method of claim 9, correcting, by each of said plurality of demodulator circuits, noise present in said respective one of said plurality of channels of said multichannel signal using a respective one of said plurality of channel estimates.

16. The method of claim 9, wherein said multichannel signal is a channel bonded signal cable television signal.

* * * * *